United States Patent [19]
Morris et al.

[11] Patent Number: 5,605,100
[45] Date of Patent: Feb. 25, 1997

[54] PROPULSION SYSTEM FOR A MAGNETICALLY MOVABLE VEHICLE

[75] Inventors: Tony J. Morris, Marietta; Kent R. Davey, Lithonia, both of Ga.

[73] Assignee: American Magley Technology of Florida, Inc., Edgewater, Fla.

[21] Appl. No.: 835,156

[22] Filed: Feb. 12, 1992

Related U.S. Application Data

[63] Continuation-in-part of Ser. No. 601,109, Oct. 23, 1990, abandoned.

[51] Int. Cl.$^6$ .............................. B60L 13/06; B60L 13/00
[52] U.S. Cl. ........................... 104/284; 104/286; 104/294
[58] Field of Search ........................ 104/282, 292, 104/284, 285, 286, 289, 290, 294; 318/135; 310/12, 90.5

[56] References Cited

U.S. PATENT DOCUMENTS

| | | | |
|---|---|---|---|
| 3,233,559 | 2/1966 | Smith et al. | 104/292 |
| 3,662,689 | 5/1972 | Kawabe | 104/286 X |
| 3,768,417 | 10/1973 | Thornton . | |
| 3,771,033 | 11/1973 | Matsui . | |
| 3,791,309 | 2/1974 | Baermann . | |
| 3,806,782 | 4/1974 | Matsui et al. | 318/135 X |
| 3,823,672 | 7/1974 | Fellows . | |
| 3,834,318 | 9/1974 | Fellows | 104/286 X |
| 3,850,109 | 11/1974 | Thornton . | |
| 3,858,521 | 1/1975 | Atherton . | |
| 3,863,574 | 2/1975 | Thomas | 104/290 |
| 3,871,301 | 3/1975 | Kolm . | |
| 3,904,941 | 9/1975 | Matsui et al. | 104/290 X |
| 3,912,992 | 10/1975 | Lamb | 310/12 X |
| 3,913,493 | 10/1975 | Maki . | |
| 3,914,669 | 10/1975 | Holtz . | |
| 3,924,537 | 12/1975 | Matsui et al. | 104/292 X |
| 3,937,148 | 2/1976 | Simpson . | |
| 3,940,680 | 2/1976 | Tadokoro et al. | 104/289 |
| 3,951,074 | 4/1976 | Cooper . | |
| 4,299,173 | 11/1981 | Arima et al. | 104/284 |
| 4,356,772 | 11/1982 | van der Heide . | |
| 4,381,478 | 4/1983 | Saijo et al. | 104/292 X |
| 4,624,617 | 11/1986 | Belna . | |
| 4,641,065 | 2/1987 | Shibuki et al. | 318/135 |
| 4,646,651 | 3/1987 | Yamamura et al. | 104/290 X |
| 4,664,578 | 5/1987 | Kakehi . | |
| 4,793,263 | 12/1988 | Basic . | |
| 4,805,761 | 2/1989 | Totsch . | |
| 4,817,533 | 4/1989 | Azukizawa . | |

FOREIGN PATENT DOCUMENTS

| | | | |
|---|---|---|---|
| 53101 | 4/1980 | Japan | 104/289 |

*Primary Examiner*—Robert L. Oberleitner
*Assistant Examiner*—Kevin D. Rutherford
*Attorney, Agent, or Firm*—Levisohn, Lerner, Berger & Langsam

[57] ABSTRACT

A propulsion system for a magnetically movable vehicle includes at least one means for producing a horizontal magnetic field mounted to the vehicle; a conductor adjacent to, but not in physical contact with, the means for producing a horizontal magnetic filed; and means for passing direct current through the conductor; wherein, the conductor is oriented so that the current passing through the conductor will interact with the horizontal magnetic field to generate a linear force sufficient to move the vehicle.

5 Claims, 11 Drawing Sheets

Figure 7a: Control Circuit Block Diagram

Figure 7b: Control Circuit Logic Flow

PROPULSION SYSTEM FOR A MAGNETICALLY MOVABLE VEHICLE

This is a continuation-in-part of patent application Ser. No. 07/601,109 filed on Oct. 23, 1990, now abandoned.

I. BACKGROUND OF THE INVENTION

A. Technical Field of the Invention

The present invention relates to a propulsion system for a magnetically levitated or suspended vehicle. More particularly, a linear DC motor-type propulsion system uses current variation for speed control. The propulsion system can in part be supported by electromagnetic or electrodynamic suspension systems, and current transients or dynamic braking can be used to provide power to auxiliary electrical devices on the vehicle.

B. Description of the Related Art

Presently, magnetic suspension or magnetic levitation ("maglev") systems use linear AC synchronous-type machines for propulsion. These systems generally incorporate three phase coils with cores laid along a guideway and powered to create a moving magnetic field. The moving magnetic field "pulls" magnets on a vehicle to induce vehicle movement, and speed control is obtained by varying the frequency and phase of the current powering the coils.

Consider the following examples. U.S. Pat. No. 3,768,417, "Transportation System Employing an Electromagnetically Suspended, Guided and Propelled Vehicle" (THORNTON & KOLM); U.S. Pat. No. 3,771,033, "Apparatus for Propelling A Movable Body in a Suspended State At A Very High Speed" (MATSUI); U.S. Pat. No. 3,850,109, "Transportation System Employing Magnetic Levitation, Guidance And Propulsion" (THORNTON); U.S. Pat. No. 3,871,301, "Stabilization and Ride Control of Suspended Vehicles Propelled by a Linear Motor" (KOLM); U.S. Pat. No. 3,913,493, "System for Propelling Train by Linear Synchronous Motor" (MAKI); and U.S. Pat. No. 3,914,669, "System for Attenuating Vertical Oscillations of a Suspended Track Bound Propulsion Vehicle" (HOLT) all use linear synchronous type machines as propulsion systems.

To focus for a moment on one of these patents, MATSUI uses a vertical ladder type of structure with overlapped, diamond-shaped synchronous coils. Different coil segments are pulsed with DC at separate times to create a moving magnetic field equivalent to that produced by standard synchronous coils. Thyristors are used to preclude the excitation of the coils with variable frequency. Pushing more current through the MATSUI coils without speeding up the excitation of the thyristors will not make the MATSUI vehicle go faster.

As articulated in the above-referenced patents, AC synchronous machine propulsion systems are known to have certain limitations and drawbacks. Such systems, for example, are sensitive to air gap fluctuations between the vehicle and the rail(s). These fluctuations pose design problems for electrodynamic suspension systems in which vehicle lift height varies with speed.

Prior to the invention disclosed herein, no teaching is known to disclose a vehicle propulsion system in which current in a current rail assembly interacts with a fixed magnetic field of the vehicle to propel the vehicle, and wherein the current in the current rail assembly, the magnetic field strength, or both can be increased to make the vehicle go faster.

II. SUMMARY OF THE INVENTION

It is an object of the present invention to provide a better propulsion system for a magnetically movable vehicle.

It is a further object of the present invention to provide means for controlling vehicle speed by altering the average current flowing through a conductor, a magnetic field strength, or both.

It is another object of the present invention to provide an embodiment having the propulsion system applied to a maglev train.

It is yet another object of the present invention to provide suspension systems for the vehicle of the present invention.

It is still another object of the present invention to provide means for using current transients or regenerative braking to power auxiliary electrical equipment on the vehicle.

These and other objects associated with this invention are accomplished with a linear DC propulsion system including at least one means for producing a horizontal magnetic field, and adjacent thereto, means for passing direct current through at least one conductor located so that the current passing through the conductor will interact with the horizontal magnetic field to generate a linear propulsion force sufficient to move the vehicle.

In one embodiment, the at least one means producing the horizontal magnetic field can be superconducting magnetic coils, when they become commercially available. Otherwise, neodymium iron boron (NIB) magnets or the equivalent can be used. There can be a plurality of current in a conductor rail assembly mounted on a guideway. Each of the conductors is controlled by a respective thyristor. The thyristors, and thus the conductors, are powered to create a variable rectified current passing through the current rail assembly. The current in the conductors is direct current, which interacts with the horizontal magnetic field to provide a wide range of linear propulsion forces. Means for controlling speed for a vehicle propelled by the propulsion system includes means for varying the average amount of current in the conductors. The vehicle, such as a maglev train, can use magnetic repulsion or magnetic attraction forces for a suspension system. A power generator on the vehicle uses regenerative braking of the current transients in the propulsion system to provide electricity to auxiliary electrical devices on the vehicle.

III. BRIEF DESCRIPTION OF THE DRAWINGS

FIG. 1 provides an overview of an embodiment of the present invention, wherein vehicle 1 is depicted as a maglev train.

IV. DETAILED DESCRIPTION OF THE INVENTION AND A PREFERRED EMBODIMENT

A. Overview of the Linear Propulsion System

Figure 1:
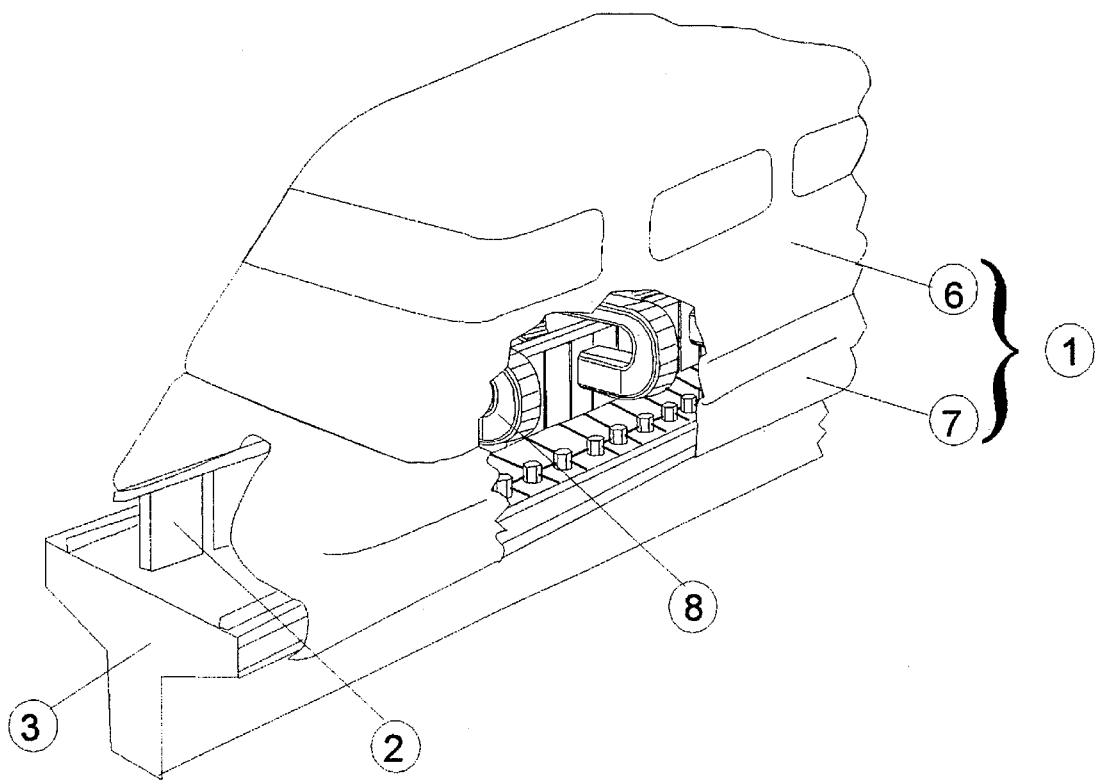

FIG. 1 provides an overview of an embodiment of the present invention, wherein the vehicle is depicted as a maglev train. It is to be understood, however, that the propulsion system of the present invention could alternatively be incorporated in some other kind of vehicle, such as a sled, centrifuge mechanism, catapult, actuator, or the like, without departing from the teaching of the propulsion system herein. Of these species, however, a maglev train is considered to be a preferred embodiment of the invention, and thus, it serves as the medium for teaching the propulsion system of the present invention.

Vehicle 1 is situated adjacent to a current rail assembly 2. The current rail assembly 2 is supported by guideway 3 and comprised of at least one, but preferably a plurality of conductors 5. The conductors 5 can be bars, rods, plates, or the like.

Figure 2:
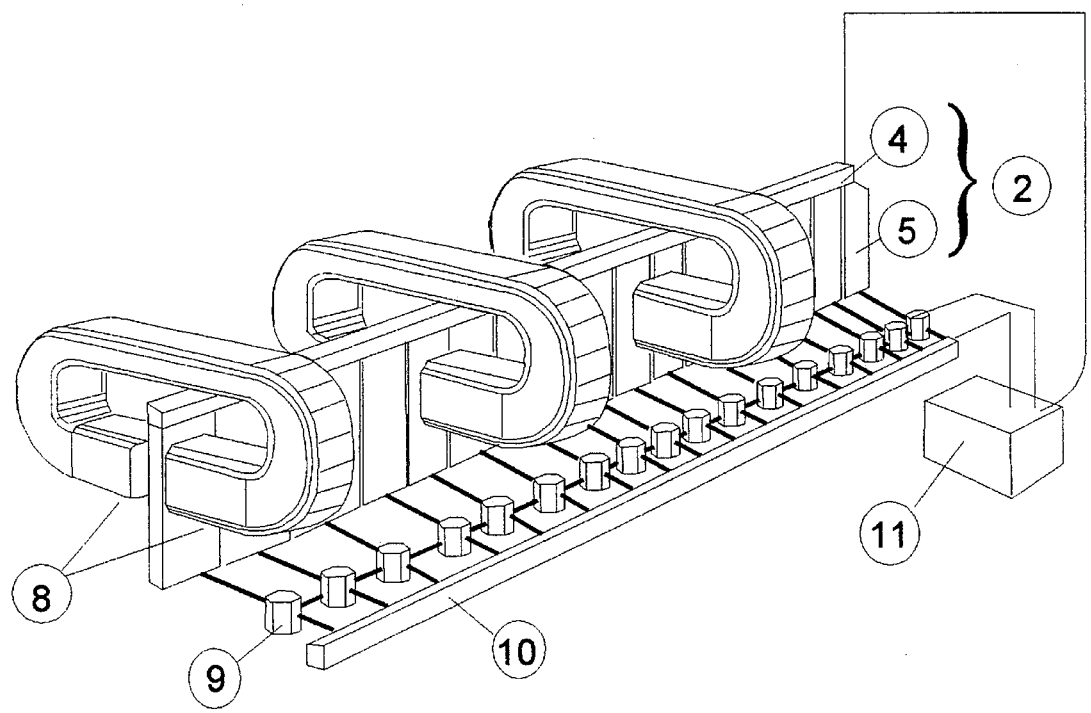
FIG. 2 is a diagram of the propulsion system and basic components of the maglev vehicle according to the present invention.

A means for producing a horizontal magnetic field 8 is mounted to the vehicle 1 in a suspension and propulsion compartment 7, as is illustrated in FIG. 2. Note that the means for producing a horizontal magnetic field 8 is devoid of a contact with the current rail assembly 2.

As previously mentioned, according to the present invention, the speed of the vehicle can be controlled by adjusting the current in the current rail assembly 2, the magnetic field strength (say, by blocking a portion of the magnetic field), or both. In these separate embodiments of the present invention, the foremost is believed preferable for a maglev train, and as such, it is discussed with greater particularly hereinafter.

FIG. 2 is a diagram of the propulsion system and basic components of the maglev vehicle of the present invention. FIG. 2 shows the current rail assembly 2, an AC power source 11, and interposed therebetween, a means for passing a direct current through the current rail assembly 2.

More particularly, the current rail assembly 2 is comprised of a common return bus 4 connected to conductors 5. One end of each of the conductors 5 is connected to a respective thyristor to form thyristor assembly 9, which connects to thyristor bus 10. In the means for passing a direct current through the current rail assembly 2, AC power source 11 conveys the AC power to thyristor assembly 9, which rectifies the power before it enters the conductors 5. This rectification produces pulsed, direct current in the conductors 5.

The conductors 5 are located so that the current will interact with the horizontal magnetic field produced by the vehicle-mounted means for producing a horizontal magnetic field 8. This interaction produces a linear force parallel to the current rail assembly 2 to induce the vehicle 1 to move. (Note that FIG. 2 is simplified by not showing the vehicle 1 or a vehicle frame to which the means for producing a horizontal magnetic field 8 is mounted.)

Speed control is accomplished by means for varying the amount of current in the current rail assembly 2, particularly in the conductors 5. Current is increased or decreased by changing the timing of the thyristor assembly 9 "chopping" action, as is subsequently discussed. After the means for producing a horizontal magnetic field 8 has been used to accelerate the vehicle to a desired speed, the current in bars 5 is reduced so the accelerating force just compensates for drag forces.

In addition, thyristor switching means keeps the current constrained to the conductors 5 adjacent to the means for producing a horizontal magnetic field 8 in order to maintain higher force conversion and minimize total current requirements. The thyristors in thyristor assembly 9 are switched "on" and "off" so that the current is conducted only to those conductors 5 adjacent to, and just in front of, the means for producing a horizontal magnetic field 8. Current through the bars 5 behind and far ahead of the magnetic field source 8 is cut "off" to increase current density in the conductors 5 adjacent to the magnetic field source 8.

Figure 3:
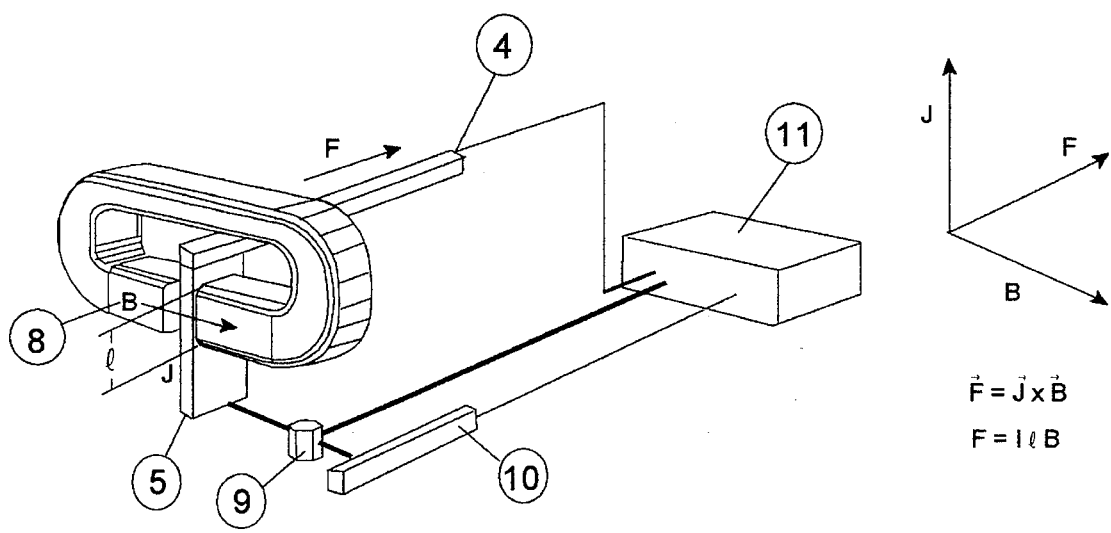
FIG. 3 is a diagram of vector relationships for the propulsion system of the present invention.

FIG. 3 is a diagram of vector relationships for the propulsion system of the present invention. FIG. 3 shows a simplified drawing of one of the means for producing a horizontal magnetic field 8 and one of the conductors 5, so as to illustrate the basic theory of operation. The current density ($\vec{J}$) in the one of the vertical conductors 5 and the horizontal field ($\vec{B}$) of the means for producing a horizontal magnetic field 8 interact to produce a force ($\vec{F}$) on the vehicle 1. The current density vector $J$ corresponds to the current in the one of the conductors 5, and the magnetic flux density vector $\vec{B}$ is in the direction of the magnetic field generated by the means for producing a horizontal magnetic field 8. The resulting force vector $\vec{F}$ is perpendicular to both $\vec{J}$ and $\vec{B}$, so as to induce vehicle 1 to move. Note, then, that propulsion is not accomplished by inducing rotary motion and translating that rotary motion into linear propulsion— the linear motion is produced directly, according to the present invention.

The equation defining the force per unit of volume is $$\vec{F} = \vec{J} \times \vec{B}$$

where $\vec{F}$ = force (Newtons/meter$^3$)

$\vec{J}$ = current density in one of the current bars 5 (Amperes/meter$^2$)

$\vec{B}$ = magnetic field density generated by the magnetic field source 8 (Teslas)

The total linear force ($\vec{f}$) = ($\vec{J} \times \vec{B}$)v = I lB sinΘ, where I = current (Amperes), l = the length of the one of the conductors 5 (meters), in the magnetic filed v = volume of the one of the conductors 5, and $\vec{f}$ = force (Newtons).

The one of the conducting bars 5 is located, with respect to the magnetic field, so that Θ remains constant at 90° (sinΘ=1). since the $\vec{B}$ of the one of the conductors 5 is constant, vehicle speed is proportional to the current (I) and the length (l) of the one of the conductors 5. Accordingly, adjusting either or both will change the vehicle speed, and these approaches are presently considered different species or embodiments of the same propulsion system invention. As to the embodiment involving a train, the speed of vehicle 1 is controlled by changing the amount of current in the conductors 5.

B. Vehicle Design Incorporating the Propulsion System

Figure 4:
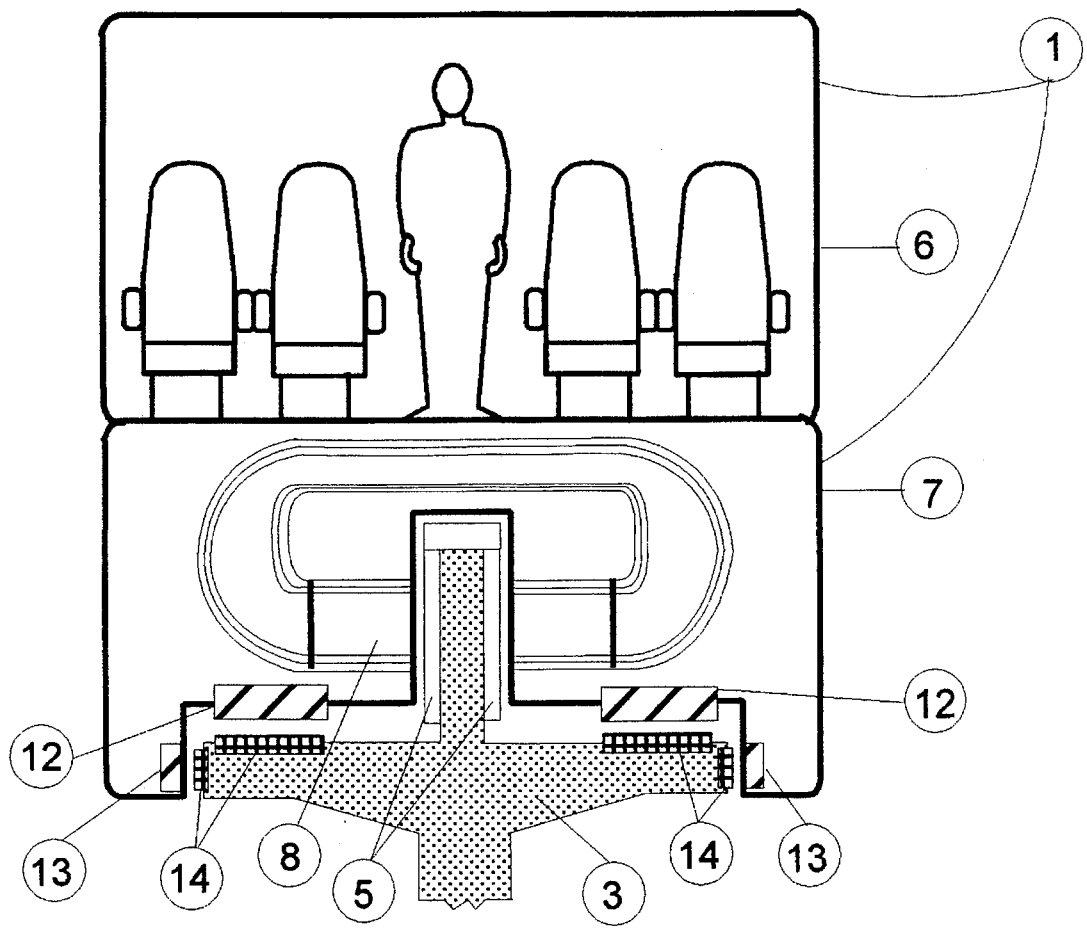
FIG. 4 is a diagram showing a cross section of a propulsion system of the present invention, as used with an electrodynamic levitation suspension system.

FIG. 4 is a diagram showing a cross section of a propulsion system of the present invention, as used with an electrodynamic levitation system. FIG. 4 illustrates how the means for producing a horizontal magnetic field 8 can be mounted in the vehicle 1 in the suspension and propulsion system compartment 7. The horizontal orientation of the magnetic field produced by the means for producing a horizontal magnetic field 8 helps minimize penetration of the magnetic field into passenger compartment 6. Also, with much of the steady state magnetic field within the suspension and propulsion compartment 7, there are minimal transient fields in the passenger compartment 6. (OSHA has expressed concern [National Maglev Initiative Workshop, Argonne National Laboratory, Jul. 11–13, 1990] over the presence of magnetic fields in areas occupied by humans.)

C. Propulsion System Suspension Systems and Guideway Designs

Figure 5:
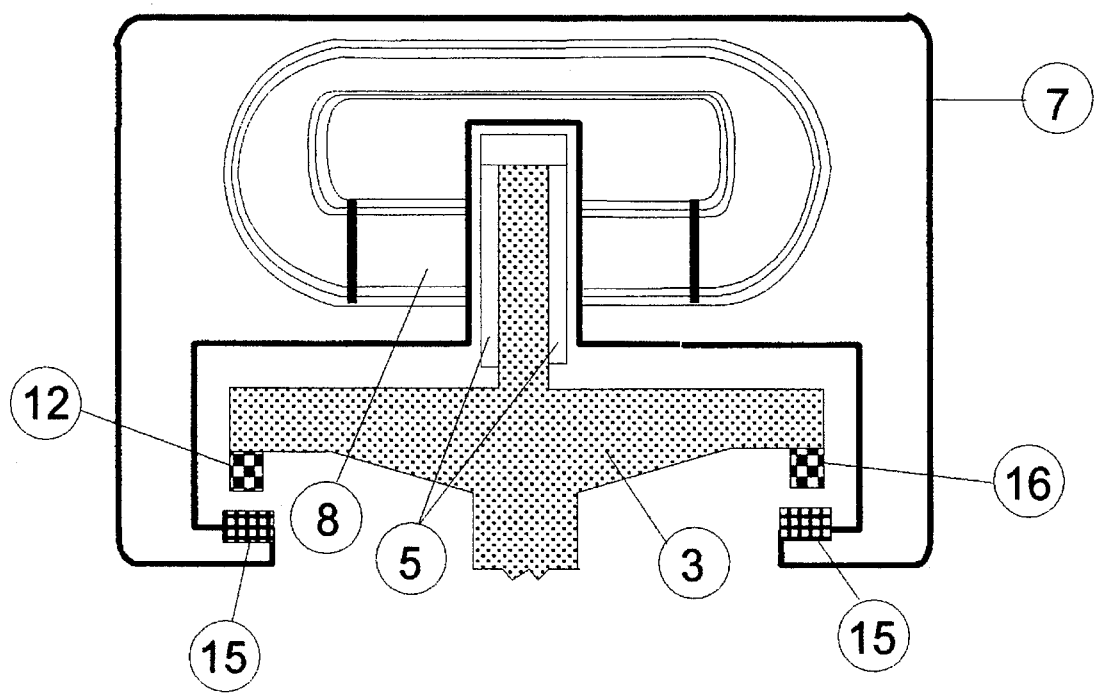
FIG. 5 is a diagram showing a cross section of the propulsion system of the present invention, as used with a magnetic levitation suspension system.

FIGS. 4 and 5 show how the suspension and propulsion compartment 7 of vehicle 1 can accommodate two basic maglev suspension systems and illustrate that the propulsion scheme of this present invention is independent of the suspension system used in a particular design. In both figures, the current rail assembly 2 is mounted directly on the center of guideway 3.

In an electrodynamic suspension system shown in FIG. 4, the means for producing a horizontal magnetic field 8, and the magnetic field produced thereby, provide room to mount electrodynamic lift magnets 12 and lateral stabilization magnets 13 (which magnetically pushes against the reaction plates 14) in guideway 3 adjacent to, or between, the propulsion system's means for producing a horizontal magnetic field 8.

This invention can also be used with a magnetic levitation system as shown in FIG. 5. A magnetic levitation approach uses lift magnets 15 attracted towards metal attractor rails 16. As can be seen in FIG. 2, the means for producing a horizontal magnetic field 8, and the magnetic field produced thereby, does not occupy the entire length of the vehicle 1. As in the case of the electrodynamic suspension system, there is space for suspension system magnets and a means for tapping current transients (not shown in FIGS. 4 or 5) to provide power for auxiliary electrical equipment such as air conditioning and lighting power sources.

D. Speed Control

The approach adopted for speed control for the present invention is to vary current in the current rail assembly 2 by altering a portion of the sine wave of the alternating current by using thyristors 9 placed along the current rail assembly 2 to control the current in each of the conductors 5.

Figure 6:
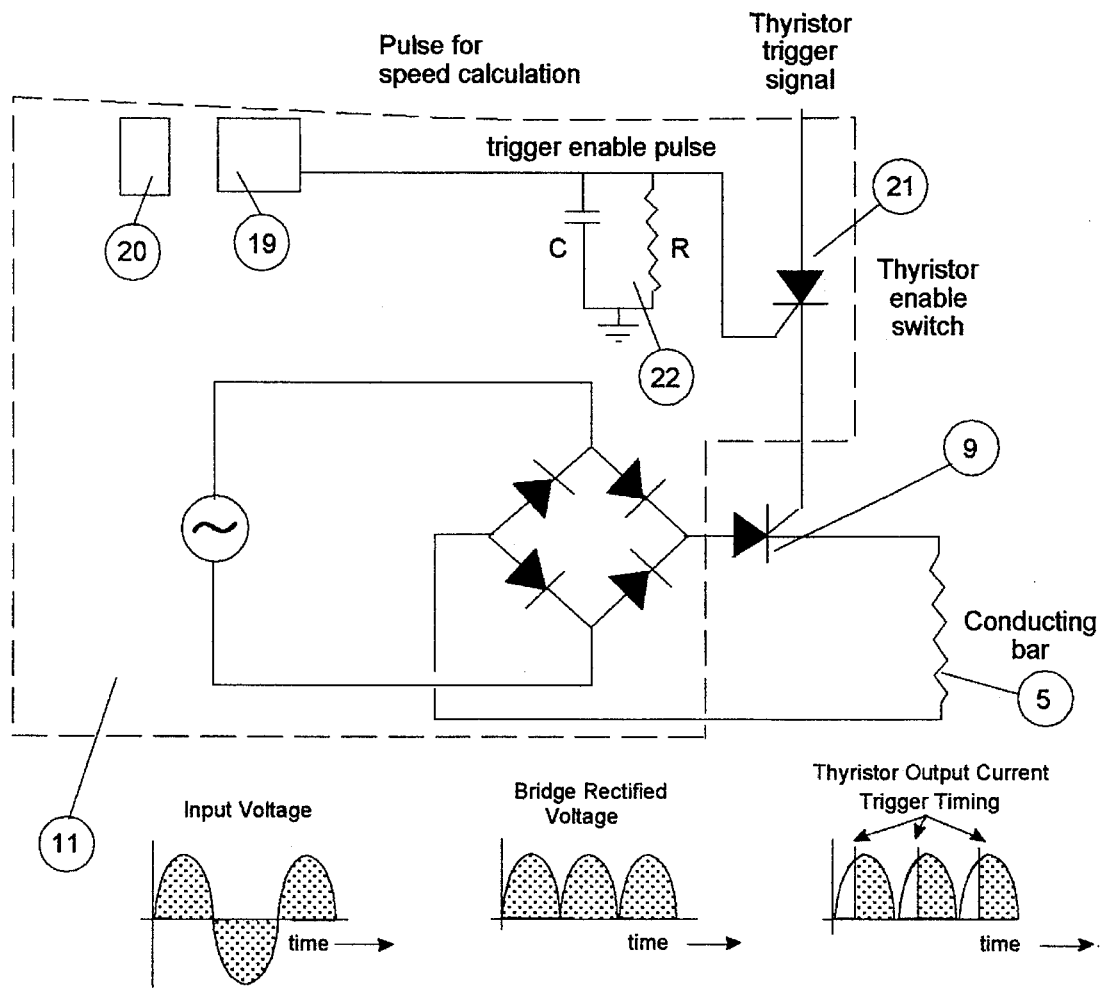
FIG. 6 is a circuit diagram of a thyristor assembly for driving current through a current rail assembly of the propulsion system of the present invention.

FIG. 6 is a circuit diagram of the thyristor assembly 9 for driving current through the current rail assembly 2 of the propulsion system of the present invention. FIG. 6 illustrates how standard thyristors and diodes can be arranged to form a thyristor-controlled bridge circuit in the thyristor assembly 9. Thyristors can be of the silicon controlled rectifier (SCR) type, such as Westcode Semiconductor's WG 5020 thyristors, and Industrial Rectifier's NTE 5828 diodes could be used for a 600 Ampere application. The waveform diagrams in FIG. 6 show how a triggering signal to the thyristors in thyristor assembly 9 reduces the average current during a sine wave cycle to achieve speed control. The trigger signal can selectively delay the thyristor conduction time (e.g., $\frac{1}{120}$ sec.), resulting in the "chopping action" shown in the output current waveform. Thus, varying the signal timing increases or decreases the average current value. Thyristor enable switch 21 allows the thyristor trigger signal to reach each thyristor at issue so that current is only in those of the conductors 5 that are adjacent to, and ahead of, the means for producing a horizontal magnetic field 8. If thyristor enable switch 21 is not "on," trigger signals will not reach the thyristor assembly 9 and it will remain "off," blocking any current from passing through the conductors 5.

The position and speed of the vehicle 1 can be determined using electro-optic or magnetic sensors 19 located along the guideway 3. A position sensor source 20 (a visible or infrared light source, or a magnet) is located on the bottom of the suspension and propulsion compartment 7 of the vehicle 1 so position sensor 20 will pass over the position sensors 19 (an optical detector or small coil) mounted on the top of the guideway 3. As the vehicle 1 passes over one of the position sensors 19, the position sensor sources 20 produce an electrical pulse at one of the position sensors 19. Knowing the distance between the position sensors on the guideway 3, and measuring the time between pulses from successive position sensors, the speed of vehicle 1 can be calculated.

An operator on the vehicle can stop the vehicle by shutting "off" the position sensor sources 20. Thus, no signal is released from the position sensors 19, the thyristor enable switch 21 is not enabled, and the thyristors in thyristor assembly 19 are not powered.

The pulse from each of the position sensors 19 is also used to activate a respective thyristor enable switch 21 to switch the appropriate thyristors in thyristor assembly 9, and the respective conductors 5, in and out of the power circuit as the vehicle 1 approaches and departs. A resistor-capacitor (RC) network 22 shown in FIG. 6 holds an enable pulse long enough to keep the thyristor assembly 9 "on" while the means for producing a horizontal magnetic field 8 is adjacent to the appropriate conductors 5.

Figure 7:
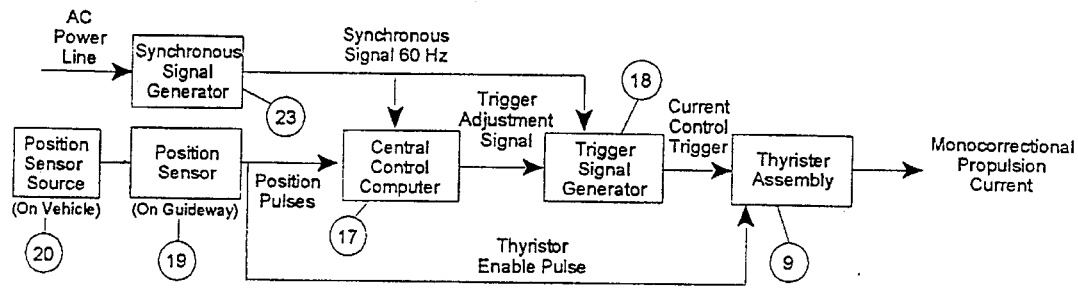
FIG. 7 is a block and logic flow diagram of means for controlling the current in the current rail assembly of the present invention.
Figure 7:
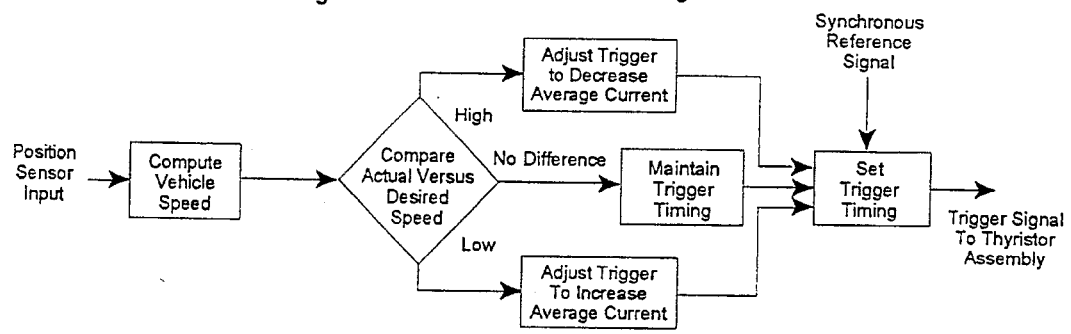

FIG. 7 is a block and logic flow diagram of a means for controlling the current in the propulsion system of the present invention. To achieve a desired speed, a control signal is sent to those thyristors in thyristor assembly 9 at the location of the vehicle. The vehicle acceleration, braking, and speed control are accomplished by a computer 17 (such as a Compaq Model 386). This computer receives position sensor input from position sensors 19 and calculates the actual speed of vehicle 1. Computer 17 then compares the actual versus the desired speed and sends any trigger adjustment signal that may be required to control trigger signal generator 18. Trigger signal generator 18 controls the timing of trigger pulses to the thyristors in thyristor assembly 9. Timing means, such as a synchronous signal generator 23 (FIG. 7), generates a reference signal so the switching time of the thyristors of thyristor assembly 9 can be controlled precisely in relation to the sine wave phasing of the 60 Hz (in the United States) voltage on the power line.

Figure 8:
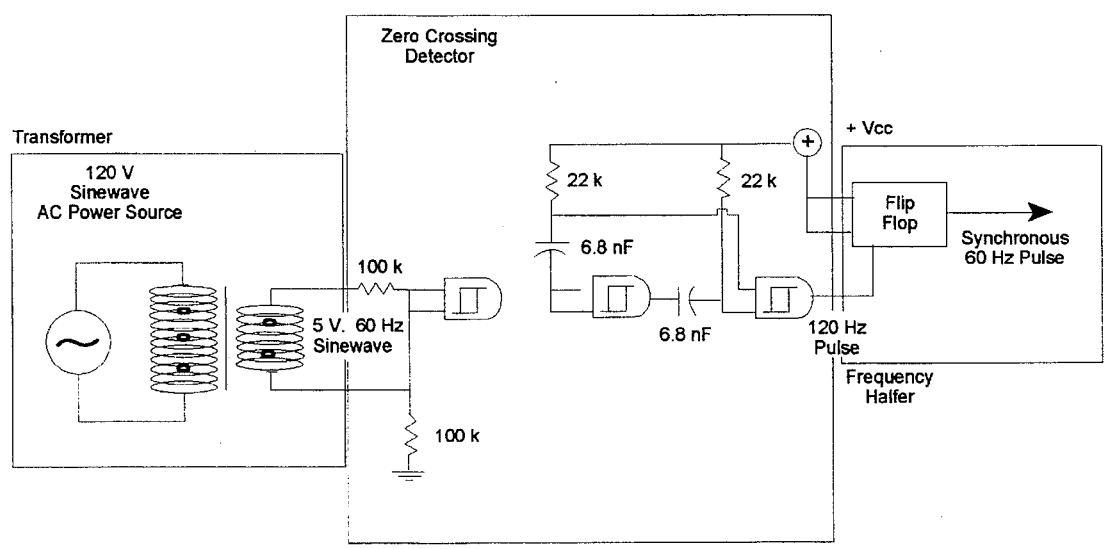
FIG. 8 is a diagram of a circuit for generating a synchronous signal for triggering thyristors in the thyristor assembly for the propulsion system of the present invention.

FIG. 8 is a diagram of a circuit for generating a synchronous signal for triggering the thyristors in the thyristor assembly along the guideway for the propulsion system of the present invention. This self-explanatory circuit should be understood as a teaching sufficient to encompass equivalent circuits that undoubtedly could be used for triggering the thyristors of thyristor assembly 9.

E. Vehicle Power Pickup

Figure 9:
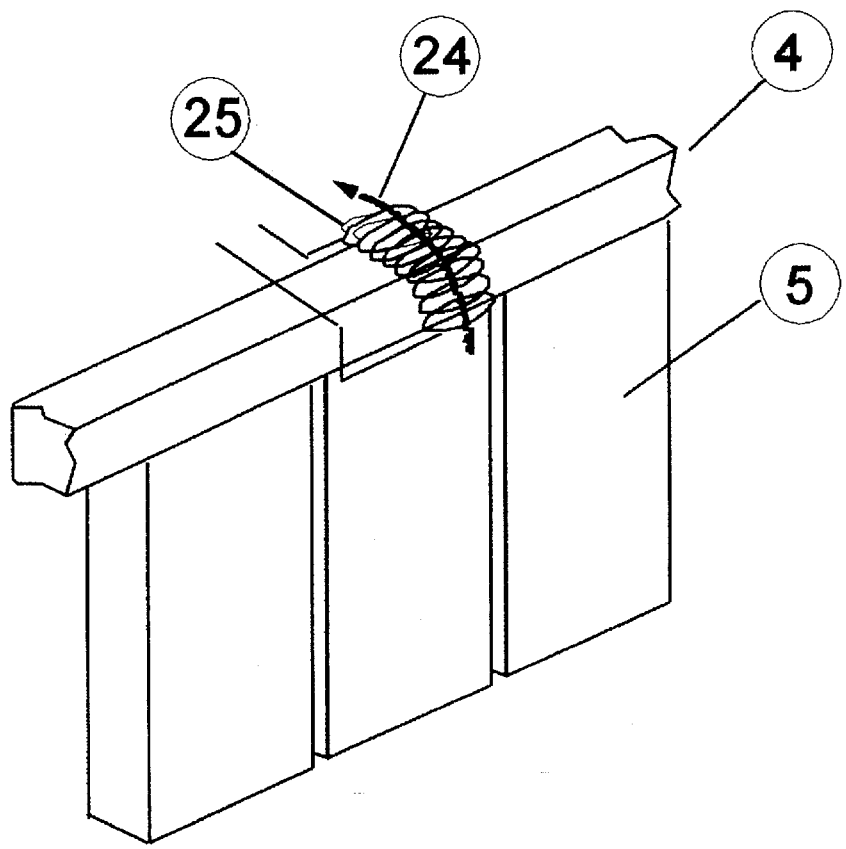
FIG. 9 is a diagram showing means for tapping current transients associated with the current to generate power for auxiliary electrical devices on the vehicle.

In vehicles 1 like maglev trains, there is a need to provide power to auxiliary electrical devices on vehicle 2. These devices can, for example, be lights, air conditioners, and the like. Regenerative braking can be used to provide this power, by having the thyristors 9 turned "on" when the line voltage is lower than the induced rail voltage. Alternatively, the current transients resulting from the thyristors going "on" and "off" can also be used. As shown in FIG. 9, the magnetic field 24 of the current flowing in the common return bus 4 can be used to induce a voltage in a vehicle-mounted power pickup coil 25 of the means for tapping current transients. The induced voltage from coil 25 can be rectified by standard diode rectifier circuits (not shown in FIG. 9). The rectified voltage can be used to provide power to auxiliary electrical equipment on the vehicle 1. The rectified voltage can also be used to charge the batteries on the vehicle 1; equivalently, when the vehicle 1 is stopped at station loading zones and no current flows through the current rail assembly 2, power electrodes at a servicing area adjacent to the station can be used to make contact with the vehicle 1 to supply power to the auxiliary electrical devices.

F. Current Rail Assembly and Current Loads

Figure 10:
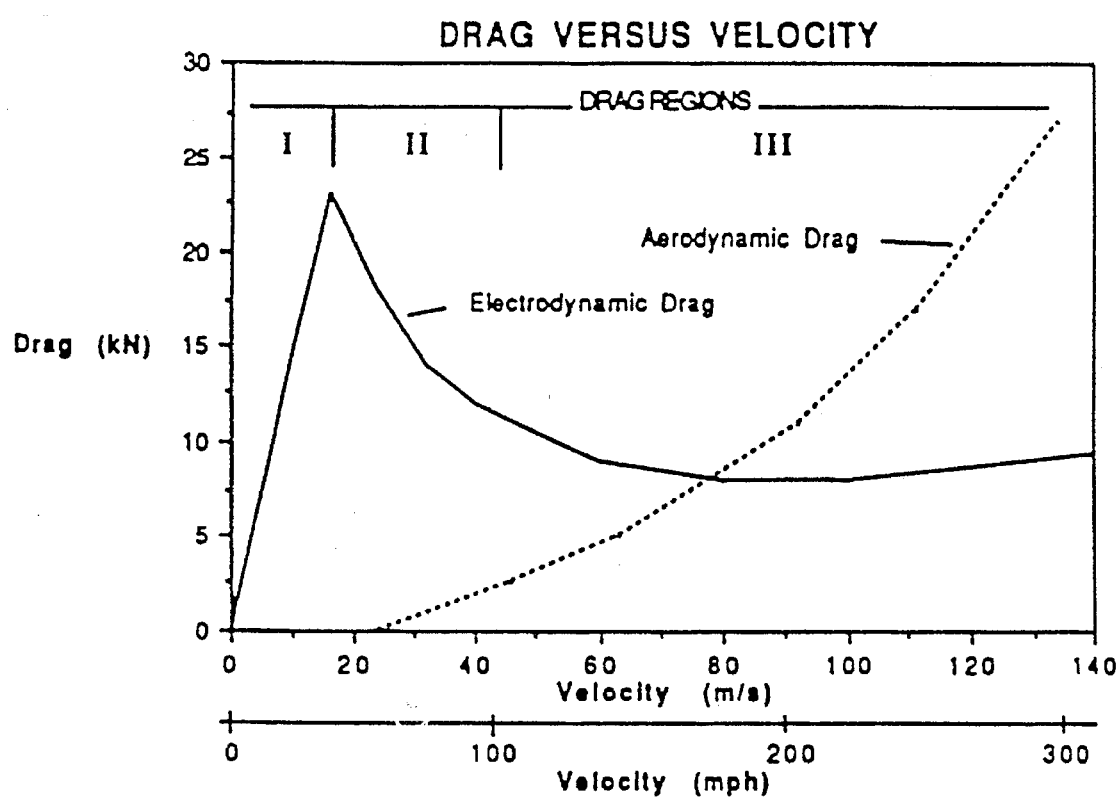
FIG. 10 is a diagram of a data plot illustrating magnetic and aerodynamic drag forces common to the suspension systems for the present invention.

FIG. 10 is a diagram of a data plot illustrating magnetic and aerodynamic drag forces common to suspension systems of the present invention. Typical electrodynamic and aerodynamic drag force profiles work against an electrodynamic lift vehicle. The maximum current required in the current rail assembly 2 occurs during acceleration when the magnetic drag peaks around 34 mph. The aerodynamic drag force is proportional to the square of the velocity and continues to increase as the speed increases.

To illustrate the operating ranges for the present invention in terms of the amounts of current in the currents 5 to accelerate the vehicle 1, the speed range shown in FIG. 10 is divided into three regions. Region I represents the high magnetic drag zone from zero to about 34 mph. Region II is the central region of acceleration to 90 mph, and Region III is the acceleration region from 90 mph to the speed of 300 mph. Using the basic equations of motion, for a vehicle mass of 13,000 kg accelerating at 1.52 meter/second$^2$, and working against the electrodynamic and aerodynamic drag forces shown in FIG. 10, one can work out the current requirements for a vehicle accelerating to, and sustaining, 300 mph. The results of these equations (solved on a per foot basis) are summarized in Table I for a vehicle 1 using ten 3 Tesla magnetic field sources as the means for producing a horizontal magnetic field 8.

TABLE I

| | Conductor Current | | |
|---|---|---|---|
| | Length (ft) | I min (A) | I max (A) |
| Region I | 28 | 0 | 243 |
| Region II | 161 | 195 | 243 |
| Region III (accelerating) | 9,678 | 195 | 315 |
| Region III (sustain 300 mph) | Indefinite* | 194 | — |

*defined by compensating for drag.

F. Vertical Current Rail Assembly Geometry and Circuit Connections

FIG. 4 shows the cross section view of the guideway 13, with the current rail assembly 2 of the present invention added to it. The current rail assembly 2 is two sided, having a central four inch concrete reinforced center slab sandwiched in between two rows of the conductors 5. The lower end of each of the conductors 5 is connected to the thyristor assembly 9, while the upper end is grounded to the common return bus 4. (An alternative geometry for the current rail assembly 2 involves using (aluminum) rods welded to the common return bus 4 in a configuration analogous to a picket fence.) As the vehicle 1 is lifted by the electrodynamic lift force, there is no change in a coupling area between the means for producing a horizontal magnetic field 8 and the conductors 5. If the levitation height of the vehicle 1 is fixed, the relationship of the magnetic field and the current in the conductors 5 yields a constant propulsion force.

Figure 11:
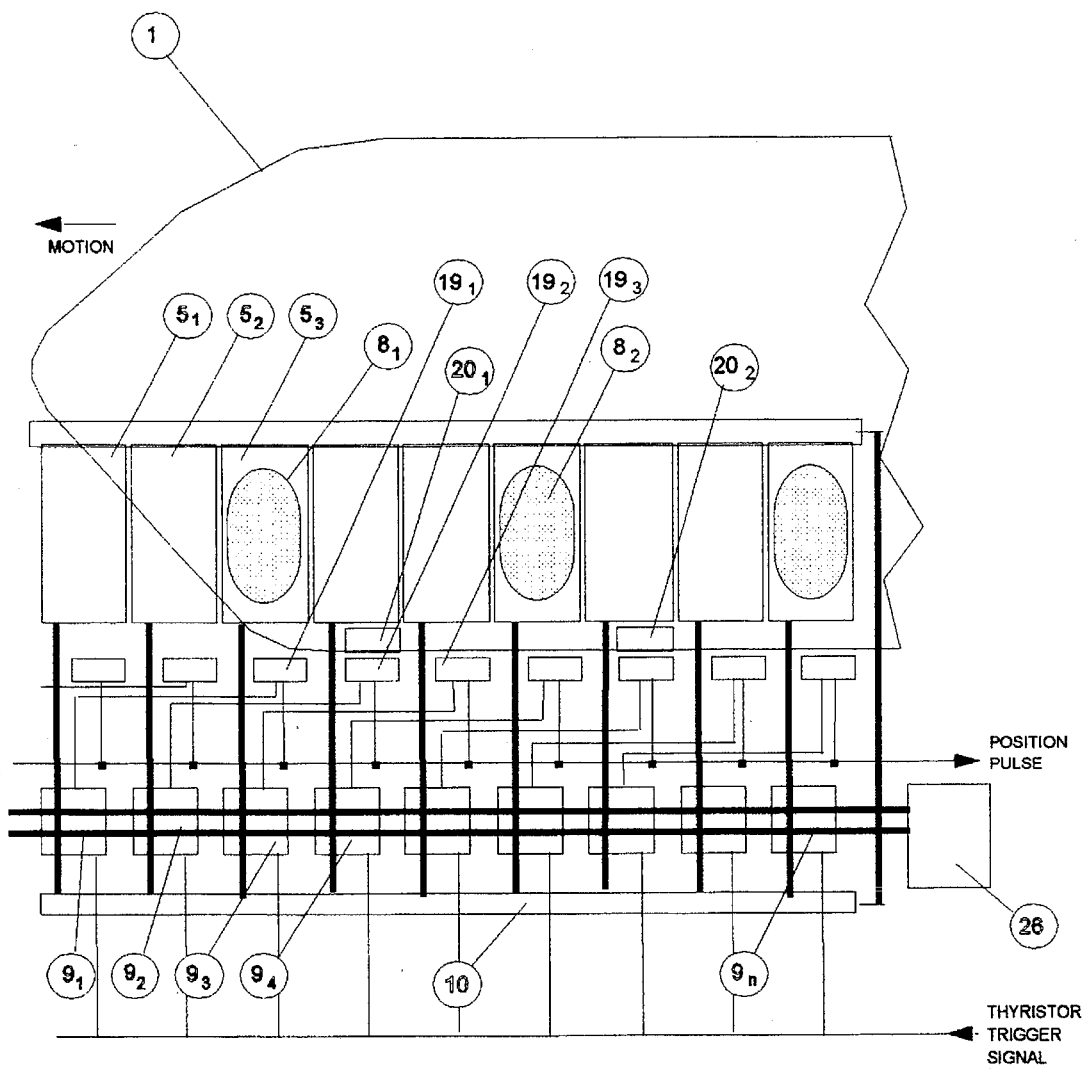
FIG. 11 is a diagram of currents in the current rail assembly, means for passing direct current through the current rail assembly 2, speed control means, and connections therebetween.

More particularly, FIG. 11 is a diagram of the means for producing a horizontal magnetic field 8, the current rail assembly 2, means for passing a direct current through the current rail assembly 2, speed control means, and connections therebetween. A standard 8 kV AC power line working through a 500–1000 volt transformer 26 activates the thyristor assembly 9 to drive the current through the current rail assembly 2. When the position sensor source 20 on the vehicle 1 pass one of the a position sensors 19, the one sensor turns "on" the thyristor enable switch 21 inside the thyristor assembly 9 (FIG. 6) and allows the thyristor trigger signal from the control circuit (FIG. 7) to activate the thyristor assembly 9 and adjust the current for speed control. The maximum firing time is dictated by back EMF voltage induced in the conductors 5 by the moving magnetic field produced by the means for producing a horizontal magnetic field 8. The lines containing signals from the position sensors 19 to the control circuit (FIG. 7), and the lines containing the thyristor trigger signal from the control circuit, run the length of the current rail assembly 2 and have repeaters or other means to maintain signal strength throughout the length of the current rail assembly 2.

In sum, the propulsion system of the present invention can be viewed as a linear DC propulsion device in which the current in a current, or the magnetic field strength, or both can be increased to make a vehicle go faster. In one preferred embodiment, current variation is used for speed control. The current variation is obtained by chopping a portion of a standard 60 Hz (in the United States) sine wave using thyristors. The thyristor is only on during a portion of a sine wave cycle (e.g., $\frac{1}{120}$ sec.) to keep the current monodirectional. In this manner, the present invention does not require any special power supply to operate the system. Electromagnetic or electrodynamic suspension systems on the vehicle, such as a maglev train, can be in the same housing as the horizontal magnetic field source. Current transients in the current rail assembly 2 are tapped to power auxiliary electrical devices on the vehicle, or regenerative braking can be used for the same function.

Although the present invention has been described in connection with a preferred embodiment, it is to be clearly understood that this is done only by way of example, and not as a limitation to the scope of the invention, which should be determined with reference to the claims.

We claim:

1. A system for transportation using magnetic propulsion, the system comprising:

a first means for producing a direct current in each of at least two conductors, said conductors each having a length and a volume (v), the current density in each of said conductors representable by a direction vector (J);

a plurality of second means for producing magnetic flux densities, said magnetic flux densities being representable by direction vectors (B); and, a maglev vehicle positioned by a guideway, said maglev vehicle attached to said first means or second means, wherein said first and said second means are not in physical contact, but are oriented so that said current densities and said magnetic flux densities will interact to produce linear forces representable by direction vectors (f) such that f=(J×B)v, so as to induce linear propulsion of said maglev vehicle with respect to said guideway in the direction of said vectors (f), and wherein said first means for producing direct current includes means on said maglev vehicle and means on said guideway interacting to provide a signal to a computer programmed to control the speed of said maglev vehicle by controlling the average value of said direct current in each of said at least two currents.

2. A method for constructing a magnetic propulsion system for transportation, said method comprising the steps of:

providing a first means for producing a direct current in each of at least two conductors having a length and a volume (v), the current density in each of said conductors representable by a direction vector (J);

providing a second means for producing magnetic flux density, said magnetic flux density being representable by flux lines, all of which have the same direction such that the magnetic flux density is representable by a direction vector (B);

providing a maglev vehicle positioned over a guideway, said maglev vehicle attached to said first means or said second means, wherein both of said first and second means are not in physical contact, but are oriented so that said magnetic flux density will interact with only the direct current in each of said at least two conductors to produce linear forces representable by direction vectors (f) such that f=(J×B)v, so as to induce linear propulsion of said maglev vehicle in the direction of said vectors (f);

electrically connecting said first means for producing said direct current to a means for controlling speed by varying the average value of said direct current while said direct current is flowing, wherein said first means for producing direct current in said at least two conductors includes means on said maglev train and means on said guideway interacting to provide a control signal, and said control signal is provided to a computer programmed to control the speed of said maglev vehicle by controlling the average value of direct current flowing in each of said at least two conductors.

3. A method for constructing a magnetic propulsion system for transportation, said method comprising the steps of:

providing a first means for producing a direct current in each of at least two conductors having a length and a volume (v) the current density in each of said conductors representable by a direction vector (J);

providing a plurality of second means for producing magnetic flux densities;

providing a maglev vehicle positioned over a guideway, said maglev vehicle attached to said first means or said second means, wherein said first and said second means are not in physical contact, but are oriented so that said current densities and said magnetic flux densities will interact to produce linear forces representable by direction vectors (f) such that f=(J×B)v, so as to induce linear propulsion of said maglev vehicle with respect to said guideway in the direction of said vectors (f); and, electrically connecting to said first means for producing direct current a means for controlling speed by varying the average value of said direct current while said direct current is flowing, wherein said first means for producing direct current in at least two conductors includes means on said maglev vehicle and means on said guideway which interact to provide a control signal, and wherein said control signal is provided to a computer programmed to control the speed of said maglev vehicle by controlling the average value of the direct current flowing in each of said at least two cinductors.

4. A method for transportation by magnetic propulsion of a vehicle, said method comprising the steps of:

producing by a first means a direct current in each of at least two conductors having a length and a volume (v), the current density in each of said conductors representable by a direction vector (J);

producing magnetic flux density by a second means, said magnetic flux density being representable by flux lines and representable by a direction vector (B);

propelling a maglev vehicle positioned with respect to a guideway, said maglev vehicle attached to said first means or said second means, wherein said first and second means are not in physical contact, but are oriented so that said magnetic flux density will interact with only the direct current in each of said at least two currents to produce linear forces representable by direction vectors (f) such that f=(J×B)v, so as to induce linear propulsion of said maglev vehicle in the direction of said vectors (f); and, controlling speed by varying the average value of said direct current while said direct current is flowing, and controlling said average value of said direct current flowing in each of said at least two currents wherein said first means includes means on said maglev train and means on said guideway which interact to provide a signal to a programmed computer, said computer controlling the speed of said maglev vehicle.

5. A method for transportation by magnetic propulsion of a vehicle, said method comprising the steps of:

producing by a first means a direct current in each of at least two currents having a length and a volume (v), the current densities representable by direction vectors (J);

producing magnetic flux densities by a plurality of second means, said magnetic flux densities being representable by direction vectors (B); and, propelling a maglev vehicle with respect to a guideway, said maglev vehicle attached to said first means or said second means, wherein said first and said second means are not in physical contact, but are oriented so that said current densities and said magnetic flux densities will interact to produce linear forces representable by direction vectors (f) such that f=(J×B)v, so as to induce linear propulsion of said maglev vehicle with respect to said guideway in the direction of said vectors (f); and, controlling the speed of said maglev vehicle by varying the average value of said direct current while said direct current is flowing, said average value of said direct current controlled by a computer programmed to control the speed of said maglev vehicle in response to a signal to said computer, said signal being produced by the interaction of a means on said maglev train and a means on said guideway.

* * * * *

UNITED STATES PATENT AND TRADEMARK OFFICE
CERTIFICATE OF CORRECTION

PATENT NO. : 5,605,100

DATED : Feb. 25, 1997

INVENTOR(S) : Tony J. Morris and Kent R. Davey

It is certified that error appears in the above-identified patent and that said Letters Patent is hereby corrected as shown below:

In the Claims:
Claim 1, last line, change "currents" to --conductors--;
Claim 4, lines 16 and 23, change "currents" to --conductors--;
Claim 5, line 4, change "currents" to --conductors--.

Signed and Sealed this

Twenty-ninth Day of December, 1998

*Attest:*

BRUCE LEHMAN

*Attesting Officer*     Commissioner of Patents and Trademarks